(12) United States Patent
Jensen et al.

(10) Patent No.: US 12,002,268 B2
(45) Date of Patent: Jun. 4, 2024

(54) AMUSEMENT PARK INTERACTIVE GUIDANCE SYSTEM

(71) Applicant: Universal City Studios LLC, Universal City, CA (US)

(72) Inventors: Jannik Ingerslev Jensen, Winter Garden, FL (US); Amanda Kate Zielkowski, Orlando, FL (US); Dennis Gebken, Orlando, FL (US); Justin Michael Schwartz, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 0 days.

(21) Appl. No.: 17/858,789

(22) Filed: Jul. 6, 2022

(65) Prior Publication Data
US 2024/0013547 A1    Jan. 11, 2024

(51) Int. Cl.
| G06V 20/52 | (2022.01) |
| A63G 31/00 | (2006.01) |
| G06V 40/20 | (2022.01) |
| H04W 4/12  | (2009.01) |

(52) U.S. Cl.
CPC ............ *G06V 20/53* (2022.01); *A63G 31/00* (2013.01); *G06V 40/20* (2022.01); *H04W 4/12* (2013.01)

(58) Field of Classification Search
CPC ........ G06V 20/53; G06V 40/20; A63G 31/00; H04W 4/12
USPC ......................................................... 348/143
See application file for complete search history.

(56) References Cited

U.S. PATENT DOCUMENTS

| 7,908,237 B2 | 3/2011 | Angell et al. |
| 8,200,515 B2 | 6/2012 | Natsuyama et al. |
| 9,338,622 B2 | 5/2016 | Bjontegard |
| 9,443,144 B2 | 9/2016 | Lucey et al. |
| 10,861,267 B2 | 12/2020 | Aman |

(Continued)

FOREIGN PATENT DOCUMENTS

| JP | 2002140594 A | * | 5/2002 |
| JP | 2007295946 |   | 11/2007 |

(Continued)

OTHER PUBLICATIONS

PCT/US2023/026857 International Search Report and Written Opinion dated Sep. 15, 2023.

(Continued)

*Primary Examiner* — James E Springer
(74) *Attorney, Agent, or Firm* — Fletcher Yoder, PC

(57) ABSTRACT

An amusement park monitoring system may include a plurality of sensor devices configured to acquire data related to one or more individuals within an amusement park and a memory storing instructions that, when executed, cause a processor to process the data from the plurality of sensor devices. The instructions further cause the processor to identify an activity performed by the one or more individuals based on the data and compare the activity to a behavior model. The behavior model may be indicative of one or more behavior threshold values associated with one or more amusement park attractions. The processor may then determine that the activity exceeds a behavior threshold value of the one or more behavior threshold values and initiate an action in response to the activity exceeding the behavior threshold value.

20 Claims, 4 Drawing Sheets

(56) References Cited

U.S. PATENT DOCUMENTS

| | | | |
|---|---|---|---|
| 11,052,821 B2 | 7/2021 | Pedersen | |
| 2013/0262216 A1* | 10/2013 | Zhang | G06Q 30/02 |
| | | | 703/2 |
| 2020/0171397 A1* | 6/2020 | Krauthamer | A63G 25/00 |
| 2021/0202067 A1* | 7/2021 | Williams | G06Q 50/265 |
| 2021/0350160 A1 | 11/2021 | Chapman et al. | |
| 2022/0057519 A1* | 2/2022 | Goldstein | G01S 17/04 |

FOREIGN PATENT DOCUMENTS

| | | |
|---|---|---|
| JP | 5129345 | 1/2013 |
| JP | 5602792 | 10/2014 |
| WO | WO-2022223830 A1 * | 10/2022 |

OTHER PUBLICATIONS

Steptoe Michael et al., "A Visual Analytics Framework for Exploring Theme Park Dynamics," ACM Transactions on Interactive Intelligent Systems, Feb. 20, 2018, vol. 8 No. 1, Article 4.

* cited by examiner

AMUSEMENT PARK INTERACTIVE GUIDANCE SYSTEM

BACKGROUND

Since the early twentieth century, amusement parks have substantially grown in popularity, and an increasing amount of people visit amusement park attractions. Amusement park personnel are tasked with monitoring the amusement park attractions to identify behavior that may be detrimental to the amusement park system or may interfere with another guest's enjoyment of the amusement park. Certain amusement park monitoring systems incorporate security cameras throughout the amusement park to provide video feeds for the amusement park personnel to view. In the event of a situation necessitating a response, such as a guest misbehaving on a particular ride or amusement park attraction, the amusement park personnel are dispatched to resolve the issue to limit a negative effect on the ride system and/or to limit a negative effect on another guest's park experience. However, detecting and/or responding to certain activities and/or behaviors without interfering with other guests' enjoyment of the park may be complicated. Accordingly, it is now recognized that it is desirable to improve amusement park monitoring systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, an amusement park monitoring system comprises a plurality of sensor devices configured to acquire data related to one or more individuals within an amusement park, a memory storing instructions, and a processor. The processor is configured to execute the instructions to process the data from the plurality of sensor devices, identify an activity performed by the one or more individuals based on the data, and compare the activity to a behavior model, wherein the behavior model is indicative of one or more behavior threshold values associated with one or more amusement park attractions. The processor is further configured to determine that the activity exceeds a behavior threshold value of the one or more behavior threshold values and initiate an action in response to the activity exceeding the behavior threshold value.

In another embodiment, a non-transitory, computer-readable medium comprises computer-executable instructions configured to, when executed, cause a processor to receive data related to one or more individuals within an amusement park from a plurality of sensor devices configured to acquire the data. The processor may then identify an activity performed by one or more individuals based on the data and compare the activity to one or more behavior models indicative of one or more behavior threshold values associated with one or more amusement park attractions. The processor may then determine that the activity exceeds a behavior threshold value of the one or more behavior threshold values and initiate an action in response to the activity exceeding the behavior threshold value.

In another embodiment, a method may include performing various operations via a processor including receiving data related to one or more individuals within an amusement park from a plurality of sensor devices configured to acquire the data. The method may further include identifying an activity performed by the one or more individuals based on the data and comparing the activity to one or more behavior models indicative of one or more behavior threshold values associated with one or more amusement park attractions. The method may further include determining that the activity exceeds a behavior threshold value of the one or more behavior threshold values and initiating an action in response to the activity exceeding the behavior threshold value.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and context of embodiments of the present disclosure without limitation to the claimed subject matter.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
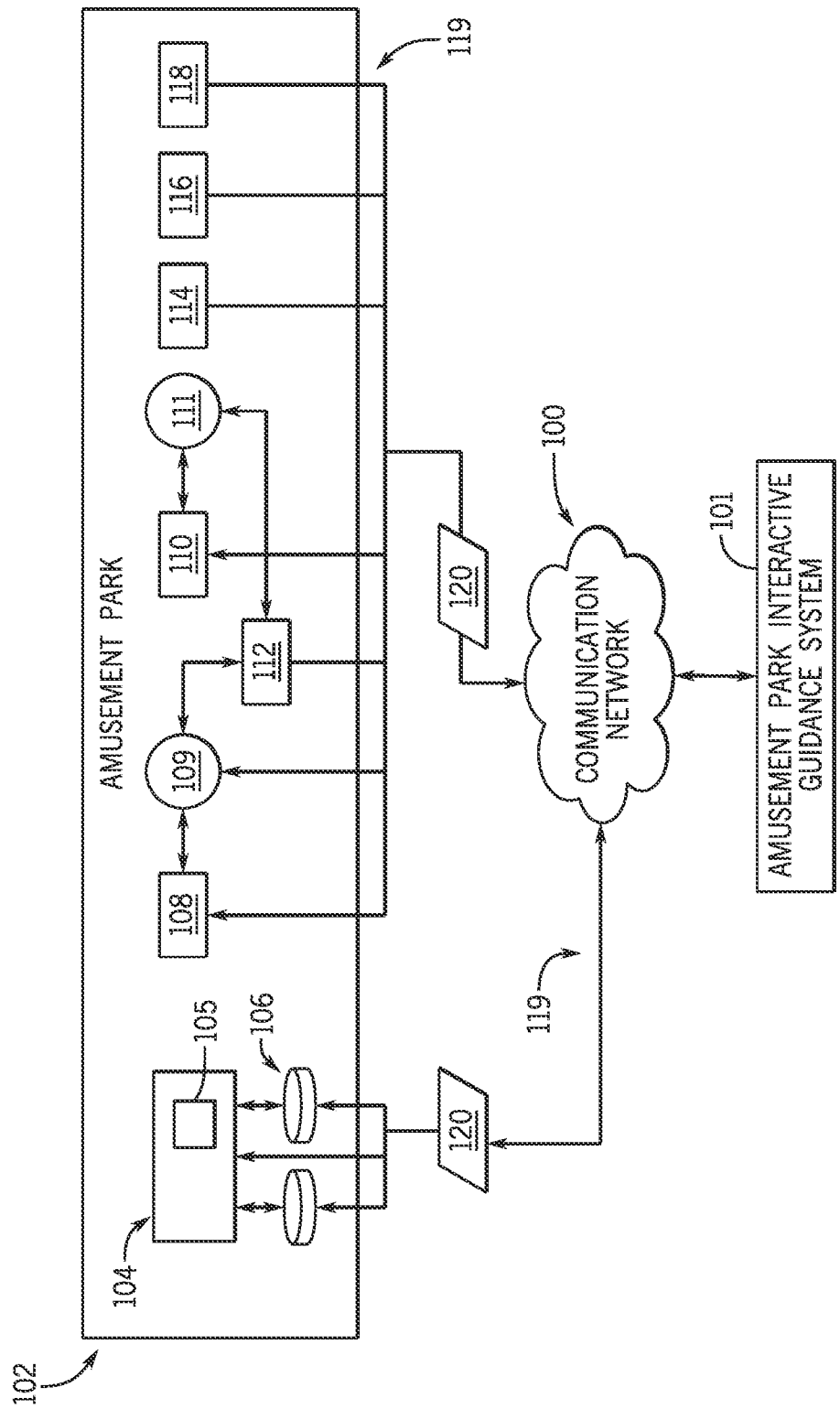
FIG. 1 illustrates a system diagram of an amusement park interactive guidance system for assessing sensor device data, in accordance with embodiments described herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to the field of amusement parks. More specifically, embodiments of the present disclosure are related to techniques for monitoring amusement park systems and generating models of amusement park attractions that incorporate real-time data related to a patron's behavior. The amusement park system or a patron's experience within the park may be dynamically adjusted based on the real-time data.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Further, aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., hard drive, memory, disk) that can direct a computer, other programmable data processing apparatus, or other devices to function in a particular manner, such that the instructions stored in the computer-readable medium intimate or cause the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

Computer program code for carrying out operations for aspects of the present disclosure may be written in any combination of one or more programming languages, including, but not limited to, an object oriented programming language such as Java, Smalltalk, C++ or the like and conventional procedural programming languages, such as the "C++" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Amusement park (e.g., theme park) personnel are tasked with monitoring amusement park attractions, guests, and other aspects of the amusement park. An increasing number of amusement parks are employing sensor devices within and/or around the park to capture data related to various aspects of the amusement park. It is now recognized that acquired data can be indicative of certain activities and/or behaviors. Further, there is a demand for use of such data in deterring or discouraging certain activities and/or behaviors, thereby facilitating amusement park enjoyment for guests of the amusement park. Accordingly, present embodiments are directed to an interactive guidance system that detects certain activities and/or behaviors performed by one or more individuals (e.g., amusement park guests, amusement park personnel) and localizes an action to address the activities and/or behaviors, thereby limiting an amount of interference with other guests' park experiences.

Presently disclosed systems and methods may track, monitor, aggregate, analyze, and integrate sensor data communicated from sensor devices disposed within and/or around an amusement park to facilitate increased enjoyment of amusement park attractions for guests within the amusement park. It is now recognized that various advantages may be gained with automated interactive guidance systems that localize responses (e.g., actions) to certain detected activities performed by one or more individuals (e.g., park guests), thereby limiting an amount of interference with another guest's park experience and/or decreasing a likelihood of degradation to an amusement park system component. Amusement park interactive guidance systems and methods in accordance with present embodiments may employ various types of sensor devices that can integrate and interpret the sensor data from the various types of devices to identify actions and/or behaviors that may interfere with another guest's experience. In turn, the guidance systems and methods may provide certain recommendations or perform certain localized actions to discourage and/or limit certain activities and/or behavior, thereby improving an overall experience for guests within the park. For example, data from different sensor devices may be assembled and analyzed to identify certain activities performed by one or more individuals associated with an amusement park attraction. The identified activities may be compared to a behavior model, which may correspond to various behavioral threshold values. Upon determining that a particular activity exceeds preset behavioral threshold values, the system may initiate an action to limit the activity performed by the one or more individuals without impacting other individuals using the amusement park attraction. It should be noted that "exceeding" a preset behavioral threshold value may include exceeding the threshold value either direction such that, for example, a negative threshold may be exceeded in a negative direction.

By way of introduction, FIG. 1 illustrates an exemplary communication network 100 in which an amusement park interactive guidance system 101 (or IGS 101) may receive data from various devices associated with an amusement park. The communication network 100 is a geographically distributed collection of nodes interconnected by communication links and segments for transporting data between end nodes, such as personal computers, smart phone devices, sensor devices, amusement park attractions, virtual reality (VR) components, augmented reality (AR) components, and the like. Many types of networks are available, with the types ranging from local area networks (LANs) to wide area networks (WANs). LANs typically connect the nodes over dedicated private communications links located in the same general physical location, such as an insured property. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

Specifically, FIG. 1 is a schematic block diagram of the communication network 100 (e.g., amusement park communication network) comprising various nodes/sensor devices. The IGS 101 may be considered part of the communication network 100 and may receive data from the various nodes/sensor devices via the communication network 100. The IGS 101 may be any suitable computing or server device. By using data sources and nodes available to the IGS 101, it may receive data associated with an aspect of an amusement park 102 (e.g., amusement park attraction, guest of the amusement park) to determine whether to initiate actions to respond to certain activities and/or behaviors. The responses initiated by the IGS 101 may be localized to the one or more individuals (e.g., individuals performing the detected activity or behavior) or associated locations (e.g., a ride vehicle), thereby limiting an amount of interference with other guests' park experiences and facilitating enjoyment for guests within the amusement park 102.

The communication network 100 may include various sensor devices 106 associated with the amusement park 102. In particular, one or more sensor devices 106 may be associated with one or more amusement park attractions 104 within the amusement park 102, and each of the amusement park attractions 104 may include one or more components 105. The communication network 100 may also include guest computing devices 108 associated with one or more individuals 109 (e.g., park guests, amusement park personnel), operator computing devices 110 associated with one or more operators 111, smart devices 112, servers 114, routers 116, and switches 118 interconnected by various methods of communication. For instance the links 119 may be wired links or may comprise a wireless communication medium (circuitry for wireless operation), where certain nodes are in communication with other nodes, e.g., based on distance, signal strength, current operational status, location, etc. Moreover, each of the devices can communicate data packets 120 (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

The amusement park 102 may include various attractions 104 that provide an amusement park experience for individuals 109 within the amusement park 102. For example, amusement park attractions 104 may include virtual reality (VR) attractions, augmented reality (AR) attractions, roller coasters, board walks, water rides, family rides, group rides, and the like. Further, each of the amusement park attractions 104 may be associated with one or more components 105 configured to enable operation of the amusement park attraction 104. The components 105 may range from tracks, vehicles, haptic feedback sensors, paths, speakers, VR headsets, AR headsets, headphones, slides, displays, controllers, joysticks, and other components that enable the amusement park attraction 104 to provide an experience for a guest 109. It should be noted that the examples above are not intended to be limiting and the amusement parks 102 discussed herein may include any other amusement park attractions 104 and components 105 that provide an experience for guests within the amusement park 102.

The sensors 106 may be any suitable electronic devices that are capable of measuring location, pressure, movement, temperature, light, moisture, and the like. The one or more sensors 106 may provide information and/or data indicative of an activity or behavior associated with one or more individuals 109 (e.g., guests), a location of the activity or behavior, a time of the activity or behavior, image and/or video data of the activity or behavior, damage related to the activity or behavior, and the like. The one or more sensors 106 may be disposed within the amusement park 102 and associated with one or more amusement park attractions 104 and/or components 105 of the amusement park attractions 104. For example, a motion detection sensor may be disposed on a ride vehicle and may be configured to capture motion data of a guest within the ride vehicle to determine whether the guest is contained within certain position threshold values. The various types of sensors 106 will be discussed in detail with respect to FIG. 3 below.

Figure 2:
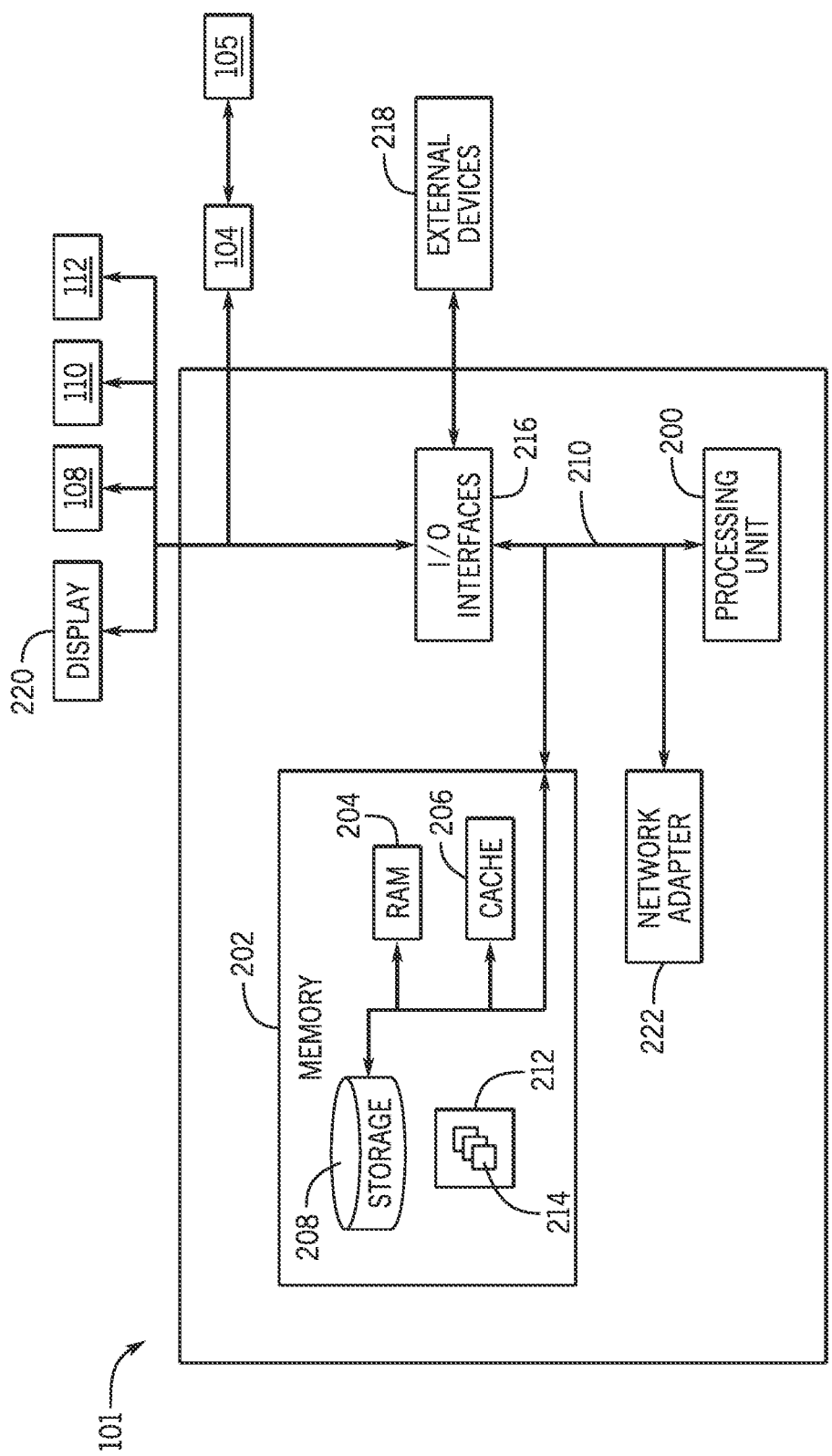
FIG. 2 illustrates a block diagram of a computing device that may be part of the amusement park interactive guidance system of FIG. 1, in accordance with embodiments described herein.

FIG. 2 is a schematic block diagram of an embodiment of the IGS 101 of FIG. 1 in accordance with present embodiments. As explained above, in different embodiments, various devices and the interactive guidance system 101 may be configured to communicate with each other in any suitable way, such as, for example, via communication network 100. The IGS 101 is only one example of a suitable system and is not intended to suggest any limitation as to the scope of use or functionality of embodiments of the present disclosure. That is, in some embodiments, the methods discussed herein may be performed by any suitable computing device. Regardless, the IGS 101 is capable of being implemented and/or performing any of the functionality set forth herein.

The IGS 101 may include aspects or features that may be described in the general context of computer executable instructions, such as program modules, being executed by a computer system. Generally, program modules may include routines, programs, objects, components, logic, data structures, and so on that perform particular tasks or implement particular abstract data types, and may be practiced in distributed data processing environments where tasks are performed by remote processing devices that are linked through a communications network. In a distributed data processing environment, program modules may be located in both local and remote computer system storage media including memory storage devices.

The IGS 101 is shown in FIG. 2 in the form of a general-purpose computing device. The components of the IGS 101 may include, but are not limited to, one or more processors or processing units 200, a system memory 202, and a bus 210 that couples various system components including the system memory 202 to the one or more processors 200. The bus 210 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Figure 3:
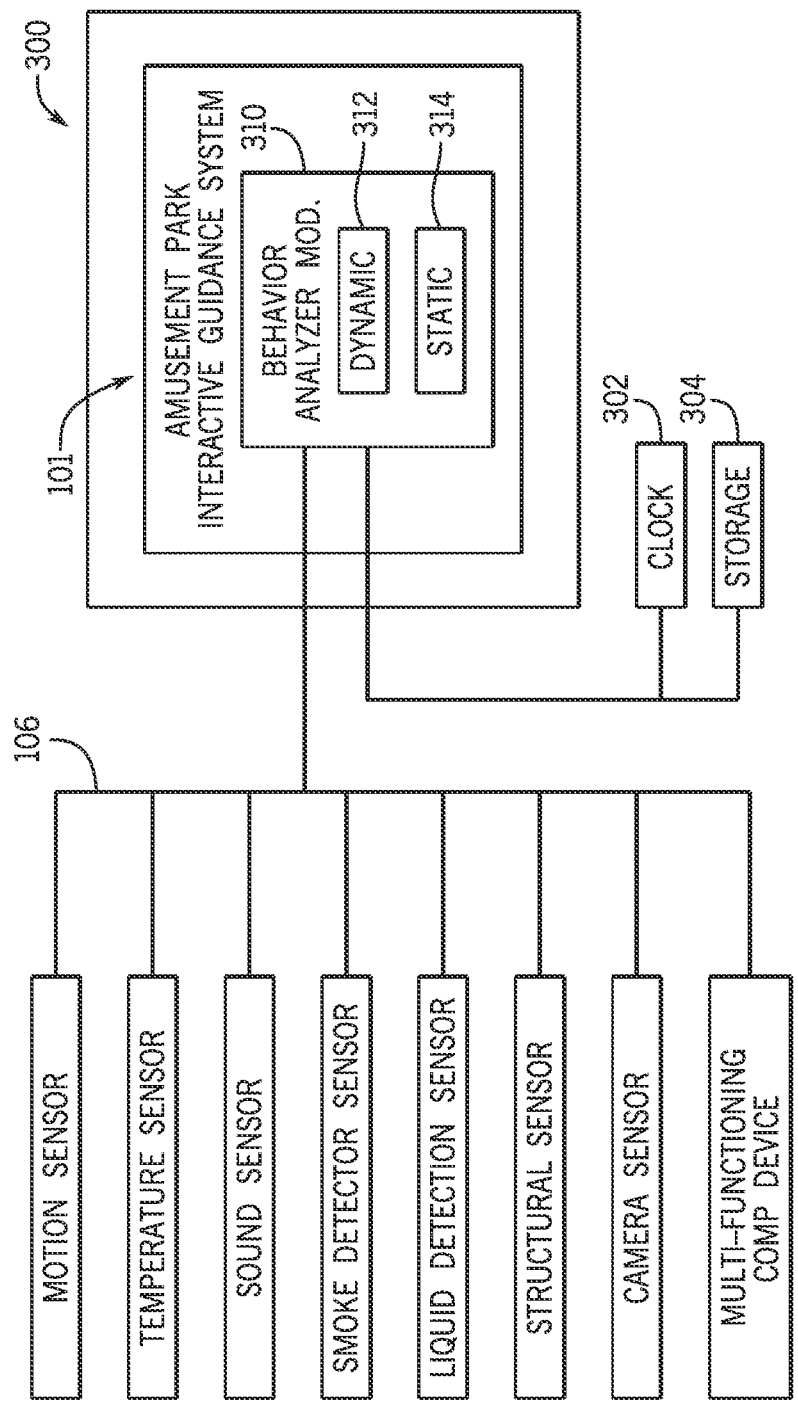
FIG. 3 illustrates a block diagram of a system and an amusement park from which sensor data is captured by the system for subsequent analysis, in accordance with embodiments described herein.

Program/utility 212, having at least one program module 214, such as a behavioral analyzer module 310 depicted in FIG. 3, may be stored in the memory 202, as along with an operating system, one or more application programs, other program modules, and program data. Each of the operating system, one or more application programs, other program modules, and program data or some combination thereof, may include an implementation of a networking environment. Program modules 214 generally carry out the functions and/or methodologies of embodiments of the disclosure as described herein.

The IGS 101 may also communicate with one or more external devices 218 such as a keyboard, a pointing device, a display 220, operator computing devices 110, smart devices 112, amusement park attractions 104, amusement park attraction components 105, and the like; and/or any devices (e.g., network card, modem, etc.) that enable the IGS 101 to communicate with one or more other computing devices. Such communication can occur via Input/Output (I/O) interfaces 216. Still yet, the IGS 101 can communicate with one or more networks such as a local area network (LAN), a general wide area network (WAN), and/or a public network (e.g., the Internet) via network adapter 222. As depicted, the network adapter 222 communicates with the other components of the IGS 101 via the bus 210. It should be understood that although not shown, other hardware and/or software components could be used in conjunction with the IGS 101.

With the exemplary communications network 100 (FIG. 1) and the IGS 101 (FIG. 2) being generally shown and discussed above, description of certain illustrated embodiments of the present disclosure will now be provided. With reference now to FIG. 3, an example of an amusement park 300 is shown, wherein a presently disclosed embodiment is implemented. The amusement park 300, which may be the same as the amusement park 102 of FIG. 1, is to be understood to represent any type of amusement park (e.g., theme park, water park, virtual reality park, augmented reality park, and the like) in which the capture and analysis of sensor data from the various sensors 106 may be useful for the reasons at least described below. The amusement park 300 includes the IGS 101 for receiving and analyzing captured sensor data regarding various aspects of the amusement park 300, as further described below.

The IGS 101 is configured and operational to receive (e.g., capture) sensor data from the various sensors 106 disposed within or around the amusement park 300 regarding certain aspects of the amusement park 300 including activities and/or behaviors performed by one or more individuals within the amusement park 300. The IGS 101 may receive the data via the communication network 100 (FIG. 1) and perform analytics regarding the captured sensor data associated with the amusement park 300, as described in greater detail below.

In the illustrated embodiment of FIG. 3, the IGS 101 is shown coupled to various types of sensors 106, which are described below. Exemplary sensor types include (but are not limited to): Motion sensor—a motion sensor is one type of sensor device 106 (e.g., detection device) that detects motion within a detection range. Thus, the motion sensor 106 may be placed to detect when guests, ride components, and/or other objects move within the motion sensor's field of vision. Another type of sensor 106 may sense motion of a structure (e.g., ride vehicle, VR headset, AR headset, ride component) to which the sensor 106 is attached. For example, either type of motion sensor 106 may detect excessive movement by one or more individuals associated with a particular amusement park attraction indicative of certain activities and/or behaviors that may have a negative effect on another guest's park experience (e.g., guests running through an attraction, guests jumping in a ride vehicle).

Temperature sensor—a temperature sensor 106 detects a temperature of a desired medium. Thus, the temperature sensor 106 may be configured to measure the temperature of air or of a specific surface (e.g., the surface to which temperature sensor 106 is attached). Further, the temperature sensor 106 may be configured to measure the temperature of one or more guests within the amusement park 300. The temperature measurements may be used to assess certain physical conditions associated with a guest. For example, the temperature sensor 106 may detect an elevated temperature of one or more guests which may be indicative of the guest not feeling well (e.g., fever, inebriated). It is contemplated herein that the temperature sensor 106 may be associated with one or more amusement park attractions 104, and may be disposed within or around the amusement park attractions and/or on the one or more components 105 of the amusement park attractions 104.

Sound sensor—a sound sensor 106 detects the presence of various ambient noises. Thus, the sound sensor 106 may be configured to detect various noises related to structural components (e.g., components 105 of amusement park attractions 104) within the amusement park 300. Further, the sound sensors 106 may be configured to detect various noises associated with one or more guests within the amusement park 300. For example, a sound sensor 106 may detect the presence of a person based on captured speech. The sound data may be indicative of obnoxious behavior (e.g., yelling, cursing) which may interfere with another guest's experience within the amusement park 300.

Smoke detector sensor—a smoke detector sensor 106 detects the presence of smoke. As with other sensors 106, the smoke detector sensor 106 may be placed anywhere within the amusement park 300 (e.g., within or on one of the amusement park attractions 104 and/or components 105). The readings of the smoke detector sensor 106 may be binary (e.g., either a gas composition is present or it is not present), or the readings may be quantitative (e.g., the percentage of air that comprises smoke, parts per million of smoke). For example, the smoke detector sensor 106 may be positioned in non-smoking areas and may detect the presence of smoke within the non-smoking areas which may be indicative of certain activities that may limit an amount of enjoyment for other guests within the park (e.g., guest is smoking a cigarette in a non-smoking area).

Liquid detection sensor—a liquid detection sensor 106 operates to detect the presence of one or more liquids. The liquid detection sensor 106 may be placed anywhere within the amusement park 300 and may be disposed on an amusement park attraction 104 and/or on one or more components 105 of the amusement park attraction 104. For example, the liquid detection sensor 106 may detect the presence of a spilled beverage on a particular ride component, which can interfere with a guest's experience on that attraction.

Structural sensor—a structural sensor 106 may operate to detect (changing) conditions of attractions or components of the amusement park 300. Structural readings from one or more locations disposed on an attraction or component of an attraction can be recorded by the sensor 106 and transmitted to the IGS 101. Similar to the motion sensor 106 discussed above, the structural sensor 106 may be configured to detect certain movements of a structure which may be indicative of certain activities or behaviors of one or more individuals (e.g., jumping on a ride vehicle).

Camera sensor—a camera sensor 106 may include a visible light camera, infrared camera, two-dimensional (2D) camera, three-dimensional (3D) camera, thermal camera, aerial imagery, radar-capable sensor, sensor that detects other wavelengths, and/or any combination thereof. The camera sensors 106 may be disposed within the amusement park 300 and may be associated with one or more amusement park attractions and/or components. The camera sensors 106 may be configured to capture video and/or image data of various guests within the park, and the video/image data may be utilized to identify certain activities and/or behaviors of one or more individuals within the amusement park 300. For example, the camera sensors 106 may capture video/image data of one or more individuals misbehaving (e.g., fighting, drinking, yelling, running). The IGS 101 may be configured to analyze the data to identify such activities and perform/initiate actions to limit those activities, thereby limiting an amount of interference with other guests' park experience, as described in greater detail below.

Multi-function computing devices—a multi-function computing device 106 may include, for exemplary purposes only and without limitation, smart phones, tablets, cellular phones, laptops, desktops, webcams, smart TV camera devices (and other camera devices), and/or similar devices. Such multi-function computing devices 106 may passively contribute (e.g., periodically gather information and communicate it to the IGS 101 without user action) and/or actively contribute (e.g., the user must proactively gather data and/or proactively send the data after it has been gathered, the gathering being proactive and/or passive). For example, other guests within the amusement park 300 may submit data or information indicative of one or more individual's activity and/or behavior to the IGS 101.

As generally noted above, the sensors 106 may capture and analyze or facilitate analysis of certain parameters relating to the amusement park 300 to identify activities and/or behaviors of one or more individuals that may have a negative impact on an aspect of the amusement park 300 and/or another guest's park experience. Using the sensor data, the IGS 101 may initiate actions to discourage or limit such activity or behavior, thereby increasing enjoyment for guests and improving an overall guest experience within the amusement park 300. The sensors 106 can be networked into a central computer hub (e.g., IGS 101) in an amusement park 300 to aggregate and analyze collected sensor data packets. Aggregated data packets can be analyzed in the IGS 101 or via an external computer environment (e.g., server 114). Additionally, data packets collected from sensors 106 can be aggregated into the IGS 101 and sent as an aggregated packet to server 114 for subsequent analysis whereby data packets may be transmitted at prescribed time intervals.

The IGS 101 may additionally be coupled to a clock 302, which may keep track of time for the various sensor devices 106, thereby allowing a given item of data to be associated with the time at which the data was captured. For example, the IGS 101 may recurrently receive data from the various sensors 106 related to activities and/or behaviors of one or more individuals within the amusement park 300, and may timestamp each reading. The time at which the readings are taken may be used to reconstruct events or for other analytic purposes, such as those described below. For example, the timestamps on motion sensor readings taken by a motion sensor during a ride may allow a determination, while the ride is ongoing, that a response (e.g., sending a recommendation to stop the activity) should be initiated to mitigate or limit the detected activity or behavior. In another example, the timestamps on certain sensor readings may be used to determine an amount of time taken for a user to stop a particular activity, thereby enabling the IGS 101 to modify a park experience for the one or more individuals based on the amount of time taken to respond to the recommendation to stop the activity.

A storage component 304, which may be the same as the storage 208 of FIG. 2, may further be provided and utilized to store data readings and/or time stamps in the IGS 101. For example, the storage component 304 may comprise, or may otherwise make use of, magnetic or optical disks, volatile random-access memory, non-volatile random-access memory, or any other type of storage device. There may be sufficient data storage capacity to store several hours, days, months, or years of readings. For example, the storage component 304 may have sufficient storage to allow a year of readings to be stored to allow for the behavioral analyzer module 310 to generate a behavior model based on collected and stored activities and/or behaviors. As additional sensor data from various sensors 106 around the amusement park 300 is captured and stored in the storage component 304, the IGS 101 may analyze and compare the collected data to the behavior model to identify activities and/or behaviors that may interfere with another guest's experience within the amusement park 300. Further, in some embodiments, the storage component 304 may be configured to store data associated with each of the one or more individuals 109 (e.g., guests) within the amusement park 300. For example, the storage component 304 may store data (e.g., activity data, behavior data) for each of the one or more individuals 109 in a guest profile. The guest profile may be used to monitor and track each the one or more individuals 109 during a trip to the amusement park 300, and the IGS 101 may dynamically update the guest profile as additional data is collected while the one or more individuals experience the amusement park 300. In some embodiments, the guest profiles may be utilized to store data associated with the one or more individuals 109 after the individual has departed such that the guest profiles may be recalled from the storage component 304 when an individual returns to the amusement park 300.

In the example of FIG. 3, the IGS 101 may include a behavior analyzer module 310. The behavior analyzer module 310 may comprise various types of sub-modules, such as a dynamic behavior model generator module 312 and a static behavior model generator module 314. In general, the behavior analyzer module 310 may perform an analysis of collected sensor data regarding various aspects of the amusement park 300, and the data may be utilized to generate a plurality of behavior models associated with various amusement park attractions and components of the attractions.

In some embodiments, the dynamic behavior model generator module 312 may use historical data of guests (e.g., previously stored data) within an amusement park 300 and dynamic data collected in real-time of various guests within the amusement park 300, (e.g., interactions between guests and attractions, interactions between guests and other guests), and use the data to generate behavior models indicative of acceptable and/or common behaviors and activities of guests within the amusement park 300. These behavior models may be indicative of one or more behavior threshold values that correspond to behavior executed by a high percentage (e.g., a majority, a threshold number) of guests within the amusement park. That is, the models may correspond to certain behavioral threshold values that are indicative of normal or expected behavior. For example, using collected data associated with a moving walkway amusement park attraction, the dynamic behavior model generator module 312 may determine that a high percentage of guests (e.g., over 50%, 60%, 75%) remain stationary relative to the moving walkway while on the moving walkway amusement park attraction. Similarly, the dynamic behavior model generator module 312 may determine that a high percentage of guests execute a limited amount of body movement (e.g., pointing at certain components of the amusement park attraction, turning) while maintaining a position on the moving walkway. Newly collected data may then be compared to the generated behavior models to determine whether guests within the park are performing activities and/or behaving similarly to other guests in the park (e.g., acting within the behavioral thresholds). The behavior analyzer module 310 may include a machine learning algorithm that enables the dynamic behavior model generator module 312 to collect and update the models in real-time, such that the behavior models generated are indicative of the most current type of acceptable activity. For example, a particular ride may be associated with certain noise thresholds, and a behavior model may be indicative of a high percentage of guests keeping their noise level below a certain threshold value. As an event is occurring, the dynamic behavior model generator module 312 may receive data indicative of a high percentage of guests raising their noise level above the threshold value, and the dynamic behavior model generator module 312 may update the behavior model to correlate the increased noise levels with expected or normal activity.

In some embodiments, the behavior analyzer module 310 may also include a static behavior model generator module 314 associated with preset behavioral threshold values that are independent of activity data collected by the IGS 101. That is, the static behavior model generator module 314 may include one or more behavior threshold values that are set by an operator or administrator of the amusement park 300, and are immutable threshold values (i.e., not affected by guest's activity within the park). These immutable threshold values remain unchanged regardless of a percentage of guests within the park performing a particular activity. For example, a particular amusement park attraction may include a moving vehicle. The static behavior model generator module 314 may include one or more position threshold values that define a perimeter to contain the guest. The perimeter may be defined by the vehicle itself, or in some embodiments, the perimeter may be established outside of the vehicle such that a limited amount of movement within and/or outside the ride vehicle is permitted. The behavior models stored by the static behavior model generator module 314 may be inputted by an operator or administrator of the amusement park 300 and may be updated as needed to correspond to updates within the amusement park 300. The behavior models stored within the behavior analyzer module 310 may be compared with new data to identify activities or behaviors that are outside of the behavioral threshold values, thereby allowing the IGS 101 to initiate actions to limit those activities or behaviors, as described in greater detail below.

Figure 4:
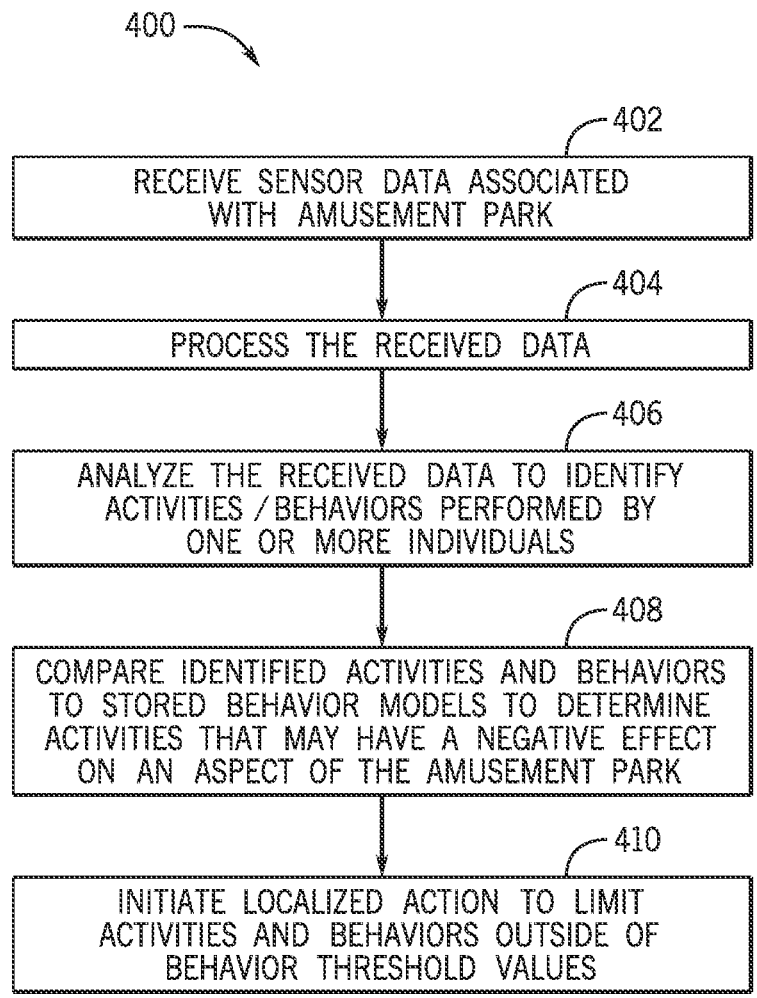
FIG. 4 illustrates a flow diagram of a method for identifying activities performed by one or more individuals within an amusement park.

With the foregoing in mind, FIG. 4 illustrates a flow chart of a method 400 employed by the IGS 101 for identifying unwanted activities and/or behaviors of one or more individuals associated with an amusement park using detected sensor data from various sensor devices 106, and localizing an action to address the unwanted activity and/or behavior. Although the following description of the method 400 is described in a particular order, it should be noted that the method 400 is not limited to the depicted order; and instead, the method 400 may be performed in any suitable order. In addition, although the IGS 101 is described as performing the method 400, it should be understood that the method 400 may be performed by any suitable computing device.

Referring now to FIG. 4, at block 402, the IGS 101 preferably receives and collects data from the various sensors 106 associated with the amusement park 300. As noted above, the various sensors 106 may be located within the amusement park 300 and may be configured to capture data associated with the amusement park 300. That is, the various sensors 106 may be configured to collect data related to one or more amusement park attractions 104, one or more components 105 of the amusement park attractions 104, and/or one or more individuals 109 (e.g., amusement park guests, amusement park personnel) interacting with the one or more amusement park attractions 104 and their respective components 105. In an embodiment of the present disclosure, at block 402, the sensors 106 may periodically capture sensor data associated with the amusement park 300 according to a data capture frequency value, and may send the captured sensor data at prescribed time intervals (e.g., every second, every 5 seconds), via communication network 100, to the IGS 101. In some embodiments, the sensors 106 may send the data nearly instantaneously to the IGS 101 to be processed and analyzed. Data collected from the sensors 106 may be aggregated into data packets, and may be sent as an aggregated data packet 120 to the IGS 101 for subsequent analysis.

At block 404, the IGS 101 processes the received data. For example, the IGS 101 may include a parser configured to parse the aggregated data packet 120 received from the sensors 106, and classify the data based on, for example, a type of sensor employed to collect a particular sub-set of the received data or a type of attraction associated with the sensor. The IGS 101 may further create a data structure for each classification. In some embodiments, the IGS 101 may employ machine learning models housed and stored on the sensors 106, the processor 200, and/or a network cloud to process the received data. The machine learning models may be used to leverage higher computer capacity, and analyze received sensor data to identify certain activities and/or behaviors performed by one or more individuals, as described in greater detail below.

At block 406, based on data collected from the various sensors 106 regarding an aspect of the amusement park 300, the IGS 101 (e.g., via behavior analyzer module 310) may integrate the collected data and conduct an analysis to identify activities and/or behaviors performed by one or more individuals. That is, the received sensor data may be indicative of actions or activities performed by one or more individuals within the amusement park. For example, data from a motion sensor may be indicative of a guest's movement through an amusement park attraction, movement along an amusement park path (e.g., boardwalk), movement while on a ride vehicle of an attraction, and/or movement relative to an amusement park component. Sound data from a sound sensor may be indicative of a guest's decibel level, a guest's enjoyment with a particular attraction (e.g., laughing, crying) and/or specific words or phrases spoken by a guest (e.g., explicit language, derogatory language, disruptive language). Image and/or video data from camera sensors may be indicative of various other activities performed by one or more guests including, but not limited to, eating, drinking, walking, jumping, running, laughing, fighting, smoking, wearing masks, taking masks off, pushing, behaving unfairly (e.g., taking another guest's place in line), and the like. Using the sensor data from the various sensors 106, the IGS 101 may identify activities performed by one or more individuals within the amusement park and further analyze the data, as described in greater detail below.

Further, in some embodiments, at block 406, the IGS 101 may integrate the collected data and conduct an analysis to identify various operational states of aspects of the amusement park. That is, the received sensor data may be indicative of an operational state of an aspect of the amusement park that is unrelated to a particular guest's activity. For example, sensor data may be indicative of a fault in an amusement park attraction (e.g., ride vehicle moving outside of expected path, speaker outputting audio below an expected threshold level, electrical components of an amusement park attraction transmitting signals incorrectly (e.g., lagging)), and the IGS 101 may initiate an action to remedy the fault, thereby limiting a negative impact on a guest's experience within the park. As another example, sensor data may be indicative of an end to a particular ride session of an amusement park attraction, and the IGS 101 may initiate actions to facilitate guests departing from the attraction, thereby limiting potential delays associated with guests having difficulty departing from an attraction.

At block 408, the IGS 101 may compare the identified activities based on the sensor data to stored behavior models to determine activities that may have a negative effect on another guest's park experience or a negative effect on an amusement park attraction component, thereby enabling the IGS 101 to initiate actions to mitigate or limit those activities or behaviors. As noted above, the behavior analyzer module 310 may include a dynamic behavior model generator module 312 and a static behavior model generator module 314 that generate or store a plurality of behavior models each having behavioral threshold values. That is, the behavior models generated and stored by the behavior analyzer module 310 may define certain behavior and/or activity thresholds that are indicative of normal, expected, or acceptable behavior within an amusement park. As disclosed herein, "normal," "expected," or "acceptable" activities or behaviors refer to activities or behaviors that are practiced by more than a defined percentage of guests within the park (e.g., performed by 80% of guests within the park, 90% of guests within the park, majority of guests within the park). Upon receiving new sensor data from the various sensors 106, the IGS 101 may compare the newly received sensor data with the one or more behavior models to identify activities or behaviors performed by one or more individuals that are outside of the behavior thresholds. In some embodiments, an identified activity may include an indicator or value that can be compared with other data, such a behavior model or threshold. Detected activities and behaviors that do not fall within the behavior threshold values stored in the behavior models may be detrimental to an aspect of the amusement park (e.g., interfere with other guests' enjoyment, detrimental to a ride system), and thus, it may be desirable for the IGS 101 to initiate actions to mitigate or limit those activities or behaviors. Further, in some embodiments, the IGS 101 may generate a guest profile associated with each guest of the amusement park. Each guest profile may be utilized to monitor and/or keep track of certain activities performed by the guests, and as additional activities are detected, the guest profile may be updated dynamically to reflect the new activities.

In an embodiment, the behavior threshold values may correspond to a position of an item or individual with respect to one or more components of an amusement park attraction. For example, as noted above, an amusement park attraction may be associated with a ride vehicle configured to transport one or more individuals through the amusement park attraction. The ride vehicle may be associated with certain position thresholds that define a boundary or perimeter to contain the guest and/or any items associated with the guest. During a ride, the IGS 101 may receive sensor data indicative of a guest or an item associated with the guest breaching one or more of the position thresholds (e.g., an arm of a guest reaching outside of the perimeter, guest holding an umbrella that breaches the defined boundary). Such activity may have a negative impact on the ride system (e.g., interfering with another guest's experience on the ride, damaging the ride system), and thus, the IGS 101 may initiate actions to limit such activity, as described in greater detail below.

In another embodiment, the behavior threshold values may correspond to motion metrics for individual or group movements. That is, the behavior threshold values may correspond to acceptable amounts of movement associated with an amusement park attraction and/or acceptable types of movement (e.g., jumping, walking, running, squirming, turning) associated with the particular attraction. For example, an amusement park attraction may include a moving pathway component configured to guide guests through the attraction. Guests may be placed at a position on the moving walkway and may be instructed to maintain their position on the moving walkway during the ride. While guests are instructed to maintain their position on the moving walkway, a limited amount of movement may be permitted to enable the guests to receive a complete attraction experience. That is, guests may be permitted to turn, point, and perform limited movements so long as their position relative to the moving walkway is maintained. During the ride, the IGS 101 may receive sensor data indicative of one or more individuals not maintaining their position on the moving walkway. For instance, sensor data may be indicative of one or more individuals walking or running while on the moving walkway (e.g., exceeding certain movement thresholds) which may have a negative effect on other guests' experience while on the moving walkway. As another example, an amusement park attraction may be configured to have guests seated while the attraction is operating. During the ride, the IGS 101 may receive sensor data indicative of one or more individuals standing up or jumping on the ride, and such movement may be outside of the expected or accepted activity defined by the behavior thresholds associated with that attraction.

In other embodiments, the behavior threshold values may correspond to sound metrics for individual or group sounds. That is, the behavior threshold values may correspond to acceptable amounts of noise (e.g., acceptable decibel level) or the behavior models may be indicative of specific trigger words that are deemed inappropriate for the amusement park. For example, sound sensors may be disposed near an amusement park attraction and configured to capture sound data related to a guest's reactions to the amusement park attraction (e.g., yelling, laughing, talking). For a particular attraction, noise levels are expected to be below a certain decibel level (e.g., guests are instructed not to talk while on the attraction so as not to interfere with another guest's experience). Thus, upon receiving sound data from one or more individuals talking or yelling during the ride (e.g., at a decibel level above the threshold value), the IGS 101 may identify the activity as an unwanted activity or behavior and initiate actions to limit the activity or behavior, as described in greater detail below. As another example, the behavior models may include one or more lists with language (e.g., words or phrases) that is considered inappropriate for an amusement park (e.g., explicit language, derogatory language). Sound sensors may employ voice-recognition technology to determine specific words spoken by one or more individuals within the amusement park, and the IGS 101 may compare the sound data with the one or more lists to determine whether an individual is speaking inappropriately. Such language may interfere with another guest's (e.g., parent and child) experience in the amusement park, and thus, the IGS 101 may initiate a response to limit such language.

In another embodiment, the behavior threshold values may correspond to an amount of time at a particular location within the park. For instance, the behavior models may indicate that a high percentage of guests (e.g., 70%, 80%, 90%) remain within a close proximity (e.g., within 100 feet) of a particular attraction for a certain amount of time (e.g., less than 5 minutes). Upon receiving sensor data indicative of one or more guests staying within a close proximity to an attraction for longer than a threshold amount of time (e.g., more than 5 minutes), the IGS 101 may initiate actions to limit the amount of lingering or loitering by the one or more individuals, thereby increasing circulation of guests within the amusement park and increasing enjoyment for other guests within the amusement park. As another example, the particular attraction may be a restaurant or bar within the amusement park and the behavior models may indicate that normal activity (e.g., activity exhibited by a defined percentage of guests) corresponds to guests staying in the restaurant or bar for less than an hour. Sensor data indicative of one or more guests staying in the restaurant or bar for longer than an hour may be identified as abnormal activity and may cause the IGS 101 to initiate actions to move those guests along such that those guests do not get too inebriated and/or other guests can enjoy the restaurant or bar.

Still in other embodiments, the behavior models may include one or more activities that are prohibited within the amusement park (e.g., removing a mask, brandishing a weapon, smoking, excessive drinking). Such activities may be defined in the static behavior model generator module 314, and thus do not change relative to guest's activities within the amusement park. For example, the amusement park may have a mask policy that requires guests to keep a mask on for the duration of their park experience to limit exposure to certain illnesses. The behavior models may allow for masks to be removed for less than a threshold amount of time or for specific, approved activities (e.g., mask off for 5 seconds, mask off for eating and drinking, mask off for interacting with a specific ride feature/component). However, if sensor data is indicative of one or more guests removing their masks for longer than a threshold amount of time or removing their mask while not performing an approved activity, then the IGS 101 may initiate actions to encourage the guest to put their mask back on so as not to disturb another guest's experience. As another example, the behavior models may indicate that smoking or excessive alcohol consumption is prohibited in the amusement park, and the threshold values may correspond to a threshold number of alcoholic beverages or a threshold amount of smoke. The IGS 101 may use facial recognition software to track certain individuals and monitor an amount of alcoholic beverages consumed over a certain period of time, such that upon determining that a guest has consumed the threshold number of beverages within a threshold amount of time, actions are initiated to limit the guest from interfering with another guest's experience within the park. In some embodiments, the actions initiated may differ based on different thresholds (e.g., two drinks associated with a particular action, three drinks associated with a different action). Similarly, upon determining that an amount of smoke exceeds certain threshold values, the IGS 101 may determine that a guest is smoking, and may initiate actions to deter such activities.

The behavior models discussed and disclosed herein are not limited to the examples listed above. The behavior models contemplated and disclosed herein may include any other behavior models that may define acceptable, common, and/or expected behavior thresholds for guests within the amusement park and/or may include allowed or prohibited activities for guests of the amusement park. Further, the IGS 101 may utilize voice-recognition technology, facial recognition technology, and the like, to track, monitor, and store the various behaviors and activities performed by one or more individuals within the amusement park. Still further, the behavior models discussed above are not intended to be exclusive of one another. In some embodiments, the IGS 101 may employ two or more of the behavior models discussed above to identify activities that may have a negative impact on an aspect of the amusement park. For example, a guest within the park may be yelling during a ride and jumping excessively, and received data may indicate that the guest is nearing the threshold number of permitted alcoholic beverages (e.g., threshold of 4 beverages and guest has consumed 3). Using the combined data and the various behavior models discussed above, the IGS 101 may determine that the guest is likely in an inebriated state, and may initiate actions to limit the guest's impact on others.

Accordingly, at block 408, the IGS 101 may analyze the received sensor data and compare the sensor data to the various behavior models and behavior thresholds to identify activities performed by one or more individuals that do not fall within the behavior threshold values or conform to the behavior models. Upon identifying the activities and/or behaviors that are outside of behavior threshold values or violate certain prescribed rules of the behavior models, the IGS 101 may initiate actions to limit those activities.

Upon identifying prohibited activities and/or behaviors or activities and/or behaviors that are outside the behavior thresholds, at block 410, the IGS 101 may automatically initiate actions to limit the prohibited activities and/or activities outside of the behavior thresholds. The actions initiated by the IGS 101 may be localized to only affect the one or more individuals performing the identified activities, such that a limited impact is imparted to other guests experiencing the same attraction or within a threshold proximity. The action may be configured to limit a respective experience of the one or more individuals performing the identified activity, while other guests within a threshold proximity (e.g., within 10 feet, on the same attraction) of the one of more individuals performing the identified activity remain unaffected (e.g., unaware that actions are being performed to limit an activity).

In some embodiments, the IGS 101 may send a notification to a computing device associated with each of the one or more individuals performing the detected activity or behavior that violates behavior thresholds. The notification may include a recommendation to stop the detected activity to avoid modifications to the guest's park experience. Further, the notification may include an indication of one or more consequences associated with a guest's detected activity. For example, the notification may include an indication that if the guest does not stop the detected activity, the guest may experience increased queue times associated with particular attractions, the guest may be prohibited from certain attractions, certain experiences within a particular attraction may be limited (e.g., VR equipment may not be provided), and/or the guest may be asked to leave the park. In some embodiments, the indication may be activated despite the user's computing device being in a sleep or low power mode to increase the likelihood that the user will take note of the notification. For example, the IGS 101 may determine that an individual (or group of individuals) running through a particular area of the park violates behavior threshold levels. Accordingly, the IGS 101 may send a notification to a computing device associated with the running guest(s) with a recommendation to stop running and an indication that if the running does not stop, the guest will experience increased queue times at a subsequent amusement park attraction. Similarly, directed audio from speakers in the guest's vicinity may communicate specifically to the guest.

As another example, using the sensor data from the various sensors 106, the IGS 101 may determine that an individual is approaching or has reached a threshold number of alcoholic beverages, and the IGS 101 may send a notification to a computing device associated with the guest. The notification may include a recommendation to stop drinking for a prescribed amount of time (e.g., no additional drinks for an hour) such that a guest's sobriety level can return to acceptable levels. Further, the notification may include a recommendation to transition to another area of the park (e.g., away from the alcoholic beverages while the guest waits for the allotted time period to expire, such that the guest can enjoy other aspects of the amusement park).

Further, in some embodiments, the IGS 101 may be configured to determine an amount of time taken for a user to respond to a particular notification or recommendation. That is, upon sending a notification or recommendation to one or more individuals to refrain from certain detected activities or behaviors, the IGS 101 may monitor the one or more individuals to determine a time at which the one or more individuals stopped the detected activity or behavior. In turn, based on the amount of time taken to respond to the recommendation, different actions may be taken. For example, upon determining that the one or more individuals stop the detected activity within a first threshold time (e.g., 5 minutes) of the notification being sent, no additional action may be taken. However, upon determining that the one or more individuals continue the detected activity past the threshold amount of time (e.g., more than 5 minutes) before stopping, the IGS 101 may initiate actions to limit the one or more individual's park experience. Further still, upon determining that the one or more individuals continue the detected activity past a second threshold time (e.g., more than 10 minutes), the IGS 101 may initiate actions to remove the one or more individuals from the amusement park (e.g., notify park personnel to escort an individual out of the park).

In other embodiments, actions taken by the IGS 101 may include placing a hold on an account (e.g., guest profile) associated with a guest to limit the guest from performing certain activities. That is, the IGS 101 may flag a particular guest's profile such that amusement park personnel are informed that the guest is limited from performing certain activities (e.g., no access to certain rides, no additional beverages). For example, as noted above, the behavior models utilized by the IGS 101 may dictate that guests are limited to a threshold number of alcoholic beverages over a prescribed time period (e.g., 2 drinks in an hour, 3 drinks in 2 hours). Upon an individual reaching the beverage threshold, the IGS 101 may flag a particular guest's profile, and the flag may be indicative of an instruction to amusement park personnel to stop serving the guest until the flag is removed from the guest's profile (e.g., until a prescribed time period has expired). In other embodiments, the hold on the guest profile may limit the guest from experiencing certain amusement park attractions until the guest performs a specific action. That is, the IGS 101 may place a hold on a guest's profile and send a notification to a computing device associated with the guest to inform the guest that certain actions (e.g., paying a fine, talking to an amusement park administrator, waiting a threshold amount of time, transitioning to another area of the park) must be taken to remove the hold on the guest's profile.

In some embodiments, actions may be initiated independently of a notification being sent to a user. That is, the IGS 101 may determine that one or more individuals are violating certain behavior thresholds, and may automatically alter a guest's experience prior to sending a guest a notification that the guest's experience might be modified. For example, the IGS 101 may determine that a group of individuals in a line for an attraction are pushing, shoving, and disrupting other guests in the line. The IGS 101 may notify amusement park personnel to remove the group of individuals from the line or escort them to the back of the line to limit a negative impact on other guests' park experience. In some embodiments, one or more individuals may be registered in a virtual queue for a particular amusement park attraction that is indicative of an amount of time before the one or more individuals can access the particular amusement park attraction. Upon determining that the one or more individuals are violating behavior thresholds, the IGS 101 may automatically add time to the virtual queues associated with the one or more individuals performing the detected activity or behavior such that the one or more individuals have increased wait times as a result of their activity or behavior. Further, guests may be mistreating equipment on a VR ride and the VR equipment may be automatically disabled in response.

In other embodiments, the IGS 101 may limit an aspect of an amusement park attraction based on detected activity violating one or more behavior thresholds. That is, IGS 101 may alter a physical component of an amusement park attraction to limit an experience of one or more individuals performing an activity or exhibiting behavior that violates the behavior thresholds. For example, the IGS 101 may reduce the amount of movement (e.g., decrease speed, decrease vibrations) of a ride vehicle carrying the one or more individuals performing the detected activity or behavior to limit the one or more individual's ride experience, while other ride vehicles carrying guests that are behaving appropriately are unaffected. As another example, in the context of a virtual reality (VR) attraction, equipment (e.g., head set, body suit, displays, ride vehicles) capable of providing visual, audio, and haptic feedback may be utilized to provide an amusement park experience for a guest. Upon detecting one or more individuals performing an activity or exhibiting behavior that violates the behavior thresholds, the IGS 101 may reduce an amount of visual, audio, and/or haptic feedback, interrupt the experience with a message (e.g., on the display) to stop the detected activity, or stop the experience and notify amusement park personnel to remove the one or more individuals from the amusement park attraction.

It should be noted that the examples above are not intended to be limiting and the IGS 101 may perform additional actions to deter certain activity or behavior while limiting an impact to other guests' park experience. Further, the IGS 101 may use the examples above in isolation or in combination with one another. For example, in some embodiments, the IGS 101 may send a notification to the one or more individuals performing the activity or behavior and place a hold on the one or more individual's guest profiles to deter certain activities or behavior. Further still, as noted above, the IGS 101 may employ a machine learning algorithm to dynamically update the behavior models stored in the behavior analyzer module 310. The algorithm may assign heavier weights to certain detected activities, such that the actions taken correspond to the assigned weight of the detected activity. That is, the weighting associated with certain activities may dictate the type of action taken (e.g., send a notification, modify guest experience, place hold on guest profile, remove guest from park) and/or an amount of corrective action required by the one or more individuals to resolve an issue associated with the detected activity. For example, running through the park may be assigned a lesser weight than using derogatory language in the park. Accordingly, using the assigned weight, the IGS 101 may determine that a notification should be sent to a guest running through the park, while guests using derogatory language may be escorted from the park. Thus, the weighting may be indicative of a tolerance level for certain activities. As another example, as noted above, actions taken by the IGS 101 may include requesting the one or more individuals performing the detected activity to perform a particular action (e.g., pay a fine). In this context, fighting in the amusement park may be assigned a heavier weight than violating a noise threshold for a particular attraction. Accordingly, using the assigned weight, the IGS 101 may determine that a higher fine may be assigned to the one or more individuals fighting, while the one or more individuals violating noise thresholds may be assigned a lesser fine or no fine.

Further, as noted above, in some embodiments, the IGS 101 may initiate certain actions based on received sensor data that is unrelated to a particular guest's behavior and/or activity. Actions taken may include sending an operator to address the issue, informing guests that a particular attraction or a particular component of an attraction is down for maintenance, adjusting a relative position of a component (e.g., ride vehicle) of an attraction to facilitate departure, and the like. In some embodiments, the relative position adjustment may be based on physical characteristics of the guest associated with the component of the attraction. For example, using the sensor data, the IGS 101 may determine a height of a guest associated with an amusement park attraction, and may adjust a position of the ride vehicle carrying the guest based on the guest's height. Thus, as a particular ride ends, ride vehicles carrying guests with increased heights may be lowered to the ground less than ride vehicles carrying guests with decreased heights.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An amusement park monitoring system, comprising:
a plurality of sensor devices configured to acquire data related to one or more individuals within an amusement park; and
a memory storing executable instructions that, when executed, cause a processor to:
identify an activity performed by the one or more individuals based on the data;
compare the activity to a behavior model, wherein the behavior model is indicative of one or more behavior threshold values associated with one or more amusement park attractions;
determine that the activity exceeds a behavior threshold value of the one or more behavior threshold values, wherein exceeding the behavior threshold value is indicative of unacceptable behavior; and
initiate an action in response to the activity exceeding the behavior threshold value, wherein initiating the action comprises limiting an aspect of the one or more amusement park attractions by reducing an amount of visual or audio feedback of a component of the one or more amusement park attractions associated with the one or more individuals.

2. The system of claim 1, wherein the processor is configured to localize the action to the one or more individuals performing the activity to limit an effect on one or more other individuals within the amusement park, wherein the one or more other individuals are within the one or more behavior threshold values.

3. The system of claim 2, wherein localizing the action to the one or more individuals performing the activity comprises sending a notification to a computing device associated with each of the one or more individuals, wherein the notification comprises a recommendation to stop the activity.

4. The system of claim 1, wherein limiting the aspect of the one or more amusement park attractions comprises reducing an amount of haptic feedback of the component of the one or more amusement park attractions associated with the one or more individuals.

5. The system of claim 2, wherein localizing the action to the one or more individuals performing the activity comprises placing a hold on a guest profile associated with each individual of the one or more individuals, wherein the hold comprises preventing access to at least one of the one or more amusement park attractions.

6. The system of claim 1, wherein the behavior threshold value corresponds to a position of an item or individual with respect to one or more components of the one or more amusement park attractions.

7. The system of claim 1, wherein the behavior threshold value corresponds to motion metrics for individual or group movements.

8. The system of claim 1, wherein the one or more behavior threshold values correspond to behavior performed by a threshold number of guests within the amusement park.

9. A non-transitory, computer-readable medium comprising computer-executable instructions configured to, when executed, cause a processor to:
receive data related to one or more individuals within an amusement park from a plurality of sensor devices configured to acquire the data;
identify an activity performed by the one or more individuals based on the data, wherein the activity initially corresponds to unacceptable behavior;
compare the activity to one or more behavior models indicative of one or more behavior threshold values associated with one or more amusement park attractions;
determine that the activity exceeds a behavior threshold value of the one or more behavior threshold values;
initiate an action in response to the activity exceeding the behavior threshold value;
determine whether a threshold number of other individuals within the amusement park are performing the activity that initially corresponds to the unacceptable behavior; and
update the one or more behavior models to include the activity within the one or more behavior threshold values such that the activity subsequently corresponds to acceptable behavior based on the threshold number of other individuals performing the activity.

10. The non-transitory, computer-readable medium of claim 9, wherein the action comprises limiting an aspect of the one or more amusement park attractions, wherein limiting the aspect of the one or more amusement park attractions comprises reducing an amount of visual or audio feedback of a component of the one or more amusement park attractions associated with the one or more individuals.

11. The non-transitory, computer-readable medium of claim 9, wherein the action comprises sending an alert including an indication to stop the activity.

12. The non-transitory, computer-readable medium of claim 11, wherein the indication comprises a message displayed via a component of the one or more amusement park attractions.

13. The non-transitory, computer-readable medium of claim 11, wherein the indication comprises haptic feedback from the one or more amusement park attractions.

14. The non-transitory, computer-readable medium of claim 9, wherein the instructions are configured to cause the processor to localize the action to the one or more individuals performing the activity to limit an effect on one or more other individuals within the amusement park.

15. A method, comprising:
receiving, via a processor, data related to one or more individuals within an amusement park from a plurality of sensor devices configured to acquire the data;
identifying, via the processor, an activity performed by the one or more individuals based on the data, wherein the activity corresponds to unacceptable behavior;
comparing, via the processor, the activity to one or more behavior models indicative of one or more behavior threshold values associated with one or more amusement park attractions;
determining, via the processor, an action in response to the activity exceeding the behavior threshold value, wherein the action comprises limiting an aspect of the one or more amusement park attractions by reducing an amount of visual or audio feedback of a component of the one or more amusement park attractions associated with the one or more individuals.

16. The method of claim 15, comprising:
determining that a threshold number of other individuals within the amusement park are performing the activity based on the data received from the plurality of sensor devices; and
updating the one or more behavior models to include the activity within the one or more behavior threshold values.

17. The method of claim 15, wherein the action comprises limiting an experience provided to the one or more individuals by the one or more amusement park attractions without impacting other individuals using the one or more amusement park attractions.

18. The method of claim 17, wherein limiting the experience comprises stopping one or more operations performed by one or more components of the one or more amusement park attractions.

19. The method of claim 15, comprising:
determining, via the processor, that the one or more individuals received an indication to stop the activity;
receiving, via the processor, additional data associated with the one or more individuals from the plurality of sensor devices;
identifying, via the processor, a response to the indication from the one or more individuals, wherein the response corresponds to an additional activity performed by the one or more individuals within the one or more behavior threshold values;
determining, via the processor, an amount of time taken by the one or more individuals to perform the additional activity; and
determining, via the processor, a second action to perform based on the amount of time taken to perform the additional activity.

20. The method of claim 19, wherein the second action comprises limiting an experience provided to the one or more individuals by the one or more amusement park attractions based on the amount of time taken to perform the additional activity exceeding a first threshold amount of time, and wherein the second action comprises removing the one or more individuals from the amusement park based on the amount of time taken to perform the additional activity exceeding a second threshold amount of time.

* * * * *